US009824591B1

(12) United States Patent
Ryan et al.

(10) Patent No.: US 9,824,591 B1
(45) Date of Patent: Nov. 21, 2017

(54) MULTI-MEDIA ANALYSIS FOR IMPLEMENTING ADVANCED FLIGHT FOLLOWING AND GENERATING OF PROJECTED TRACKS

(71) Applicant: ROCKWELL COLLINS, INC., Cedar Rapids, IA (US)

(72) Inventors: Timothy K. Ryan, Pasadena, MD (US); William George Doyen, Annapolis, MD (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 357 days.

(21) Appl. No.: 14/525,239

(22) Filed: Oct. 28, 2014

(51) Int. Cl.
*G08G 5/00* (2006.01)
*G01C 23/00* (2006.01)
*H04B 7/185* (2006.01)

(52) U.S. Cl.
CPC ......... *G08G 5/0013* (2013.01); *G01C 23/00* (2013.01); *G08G 5/0017* (2013.01); *G08G 5/0082* (2013.01); *H04B 7/18506* (2013.01)

(58) Field of Classification Search
CPC .... G01C 23/00; G08G 5/0013; G08G 5/0017; G08G 5/0082; H04B 7/18506
See application file for complete search history.

(56) References Cited

U.S. PATENT DOCUMENTS

| | | | | |
|---|---|---|---|---|
| 7,570,214 B2 * | 8/2009 | Smith | ................... | G01S 5/0027 342/451 |
| 8,072,382 B2 * | 12/2011 | Smith | ................... | G01S 5/0027 342/357.31 |
| 8,296,281 B2 * | 10/2012 | Baker | ................... | G06Q 10/109 701/3 |
| 8,497,803 B1 * | 7/2013 | Baker | ................... | G08G 5/0026 342/454 |
| 8,606,508 B2 * | 12/2013 | Baker | ................... | G06Q 30/02 701/410 |

(Continued)

OTHER PUBLICATIONS

"What data does ACARS send back to base?" aviation.stackexchange.com. Mar. 16, 2014. Online. Available: http://web.archive.org/web/20140316004124/http://aviation.stackexchange.com/questions/2278/what-data-does-acars-send-back-to-base-can-it-be-used-to-track-a-plane.*

*Primary Examiner* — Thomas G Black
*Assistant Examiner* — Peter D Nolan
(74) *Attorney, Agent, or Firm* — Angel N. Gerdzhikov; Donna P. Suchy; Daniel M. Barbieri

(57) ABSTRACT

A system and method are provided for monitoring, collecting and aggregating position information from multiple independent data sources to localize a position of an aircraft operating worldwide. The localized position information is provided to one or more end-users or stakeholders in a format for direct integration into one or more mapping and/or situational awareness display applications. Information is collected from a plurality of monitored data sources. Weighted values are applied to certain of the information collected from the plurality of data sources according to known or predictable/determinable static and/or dynamic accuracy errors and latencies of the information provided. A detailed analytic algorithm is applied to provide a probabilistic analysis that results in a resolution of a real-time, or near real-time, aircraft location, as well as an ability to accurately predict an aircraft location along a track at some future time.

18 Claims, 3 Drawing Sheets

(56) References Cited

U.S. PATENT DOCUMENTS

| | | | | |
|---|---|---|---|---|
| 8,755,992 B2* | 6/2014 | Baker | ............... | G06Q 30/02 |
| | | | | 340/945 |
| 8,958,931 B2* | 2/2015 | Baker | ............... | G08G 5/0013 |
| | | | | 342/454 |
| 8,963,776 B2* | 2/2015 | Baker | ............... | G08G 5/0026 |
| | | | | 342/454 |
| 2007/0252760 A1* | 11/2007 | Smith | ............... | G01S 5/0027 |
| | | | | 342/451 |
| 2010/0149019 A1* | 6/2010 | Smith | ............... | G01S 5/0027 |
| | | | | 342/30 |
| 2010/0191754 A1* | 7/2010 | Baker | ............... | G06Q 10/109 |
| | | | | 707/758 |
| 2013/0147652 A1* | 6/2013 | Haque | ............... | G08G 5/0008 |
| | | | | 342/21 |
| 2013/0211701 A1* | 8/2013 | Baker | ............... | G06Q 30/02 |
| | | | | 701/120 |
| 2013/0297103 A1* | 11/2013 | Baker | ............... | G08G 5/0013 |
| | | | | 701/14 |
| 2014/0002293 A1* | 1/2014 | Behrens | ............ | G08G 5/0013 |
| | | | | 342/36 |
| 2014/0067244 A1* | 3/2014 | Baker | ............... | G06Q 30/02 |
| | | | | 701/120 |
| 2014/0123315 A1* | 5/2014 | Baker | ............... | G08G 5/0026 |
| | | | | 726/28 |
| 2015/0325129 A1* | 11/2015 | Simonin | ............ | G08G 5/0082 |
| | | | | 701/14 |
| 2016/0075443 A1* | 3/2016 | Schmutz | ............ | G08G 5/0013 |
| | | | | 701/14 |

* cited by examiner

MULTI-MEDIA ANALYSIS FOR IMPLEMENTING ADVANCED FLIGHT FOLLOWING AND GENERATING OF PROJECTED TRACKS

BACKGROUND

1. Field of the Disclosed Embodiments

This disclosure relates to systems and methods for monitoring, collecting and aggregating position information from multiple independent data sources to localize a position of an aircraft operating worldwide and for providing the localized position information to one or more end-users or stakeholders in a format for direct integration into one or more mapping and/or situational awareness display applications operated by the end-user or stakeholder.

2. Related Art

Many individuals and entities, whether familiar with the vagaries of commercial and business aviation worldwide, watched in stunned amazement in March 2014 the news reports regarding the disappearance of Malaysia Airlines Flight 370. To the general public, and even those familiar with the details of sophisticated flight following worldwide, it seemed incredulous that a commercial airliner could simply disappear. Commercial news outlets clamored to find industry "experts" that could explain to the general public the current inability to geo-locate, for example, a site at which a commercial airliner could have "gone down" and/or simply disappeared.

Every time such a highly publicized event, particularly one involving a commercial airliner, occurs the aviation community, often in response to an outcry from the general public, begins to clamor for some additional technological solution by which seamless aircraft flight following worldwide may be implemented. Discussion is undertaken regarding how to eliminate "dead zones" in extreme areas of open ocean and, for example, near the North and South Pole.

Malaysia Airlines Flight 370 is just the most recent mishap that has caused additional attention to be paid to the shortfalls in worldwide flight following. In the aftermath of the Sep. 11, 2001 aviation disaster that befell the United States, there was some effort paid to determination of how the involved aircraft went off track, and to their deviations from their intended routes of flight failed to provide any automated alert. Nearly eight years later, Air France Flight 447 crashed in June 2009. It took authorities nearly two years to locate the black boxes from the Air France flight. And, as of the filing of this application, the search for the Malaysia Airlines flight continues unsuccessfully.

In June 2014, in the aftermath of the disappearance of the Malaysia Airlines flight, the International Air Transport Association (IATA) indicated that the organization was involved in formulating methods and procedures for more consistent, real-time tracking of aircraft in flight worldwide. According to the then-promulgated timeline, IATA was expected to deliver a report on their findings and initiatives to the International Civil Aviation Organization (ICAO) in December 2014.

Updated initiatives by IATA and ICAO may provide future opportunities for enhanced tracking of aircraft in flight worldwide without any dead zones, and in providing complete and/or overlapping coverage of the worldwide airspace by one or more sophisticated and likely expensive tracking solutions. It can be anticipated that participating aircraft may be required to add expensive equipment that may use to communicate directly with newly-introduced or expanded communications and tracking networks that attempt to close gaps in coverage worldwide and to provide to individual end-users and/or stakeholders an opportunity to track movement of participating aircraft in flight worldwide.

SUMMARY OF THE DISCLOSED SUBJECT MATTER

It is currently unclear what form any proposed IATA and/or ICAO initiatives may ultimately take in their implementation, how long it may take to implement those initiatives, and what costs may be associated with the implementation of those initiatives. Based on this, and in response to a clearly unmet need, it would be advantageous to provide an ability to collect multiple source data in a centralized location and to apply to that data weighting factors in support of a probabilistic analysis to provide a real-time, or near real-time, location of an aircraft in flight anywhere in the world. Additionally, it would be advantageous to resolve a projected aircraft track/location for comparison purposes in order to assess deviations between a future analyzed real-time, or near real-time, location of the aircraft against the projected aircraft track/location.

It is anticipated that an ability to fill this critical and unmet need in reporting, and predicting, a location of an aircraft in flight anywhere in the world, may be deemed invaluable to myriad aviation-related stakeholders. These stakeholders may include, for example, air navigation service providers (ANSPs) worldwide, whether they are governmental departments/agencies, state-owned companies, corporations or other entities, or private/commercial organizations. The stakeholders may also include commercial airline companies, business jet service providers, military aviation-related entities, organizations involved in aviation search and rescue, and the like. An ability to pinpoint, and project, a position of a particular aircraft may aid agencies and entities in monitoring aircraft operations for myriad beneficial purposes ranging from simple flight following to predictions of consequential deviations that may require additional inquiries and/or actions to avoid mishaps or other dangerous conditions. In an event that a mishap occurs, the ability to pinpoint the position of the particular aircraft when the mishap occurred may significantly accelerate the mobilization of assets in response and to conduct, for example, search, rescue and/or recovery.

Exemplary embodiments of the systems and methods according to this disclosure may provide a capacity to monitor a plurality of data sources that may be employed to track a position of an aircraft in a particular area. In embodiments, information may be collected from that plurality of data sources with weighted values being applied to certain of the information collected from the plurality of data sources according to known or predictable/determinable static and/or dynamic accuracy errors and latencies of the information provided.

Exemplary embodiments may apply a detailed analytic algorithm to provide a probabilistic analysis that results in a resolution of a real-time, or near real-time, aircraft location, as well as an ability to accurately predict an aircraft location along a track at some future time.

Exemplary embodiments may aggregate information received from one or more of the following data sources:
Future Air Navigation System (FANS) Automatic Dependent Surveillance (ADS-C)
Aircraft Communications Addressing and Reporting System (ACARS)
Aircraft Situational Display to Industry (ASDI)
INMARSAT (new) Airline Tracking Service Data Iridium Position Data
Automatic Dependent Surveillance-Broadcast (ADS-B) Position Reports Each of the data sources will be described in some greater detail below.

Exemplary embodiments may add to the above list of known data sources that currently provide less than worldwide coverage and/or that are not overlapping to a required extent even in areas where coverage exists, a proprietary High Frequency Data Link (HFDL) system that provides a communication medium used to exchange data between compatible aircraft-installed communication components and a plurality of HFDL ground stations worldwide. HFDL advantageously employs the unique atmospheric propagation characteristics of high-frequency (HF) radio waves and a network of HFDL ground stations to provide data link communications to properly-equipped aircraft operating anywhere in the world for collecting certain performance and frequency data relative to radiofrequency (RF) signal propagation for advantageous use according to the disclosed schemes.

Exemplary embodiments may apply statistical and probabilistic analysis to the collected data from the multiple sources in what will be referred to throughout this disclosure as a "blending" process to create real-time, or near real-time, aircraft geo-location data that may be usable by end-users and stakeholders according to their needs.

In embodiments, the information may be provided to the end-users/or stakeholders in a format that will support direct integration into graphical data mapping and/or situational awareness display applications employed by the end-users and/or stakeholders.

It is recognized that each of the various data sources may provide data inputs of variable accuracies and/or freshness (data reception latency). Each of these data sources may only provide applicable data for the moment in time at which a particular data report is transmitted from the data source. In embodiments, the disclosed schemes may apply an analytical approach that extrapolates the various independent sources data points according to a dynamic assessment of the accuracy and/or freshness of the data. The analytic algorithm may identify and discard momentarily erroneous information ("outlier information"). The analytic algorithm may then apply a pre-delivery quality assurance assessment that may assign, for example, a figure of merit for each data source, and each data point reported by the data source, at a particular time.

According to the above-described scheme, the disclosed embodiments may analyze an overlay of multiple error ellipses to provide a robust and accurate estimate of a real-time, or near real-time, geographic location of an aircraft in flight worldwide, and may translate that information, as appropriate, for a receiving end-user and/or stakeholder to incorporate the information as graphically-provided data to be displayed according to a mapping and/or situational awareness display application employed by the end-user and/or stakeholder.

These and other features and advantages of the disclosed systems and methods are described in, or apparent from, the following detailed description of various exemplary embodiments.

BRIEF DESCRIPTION OF THE DRAWINGS

Various exemplary embodiments of the disclosed systems and methods monitoring, collecting and aggregating position information from multiple independent data sources to localize a position of an aircraft operating worldwide and for providing the localized position information to one or more end-users or stakeholders in a format for direct integration into one or more mapping and/or situational awareness display applications operated by the end-user or stakeholder, will be described, in detail, with reference to the following drawings, in which.

DESCRIPTION OF THE DISCLOSED EMBODIMENTS

Figure 1:
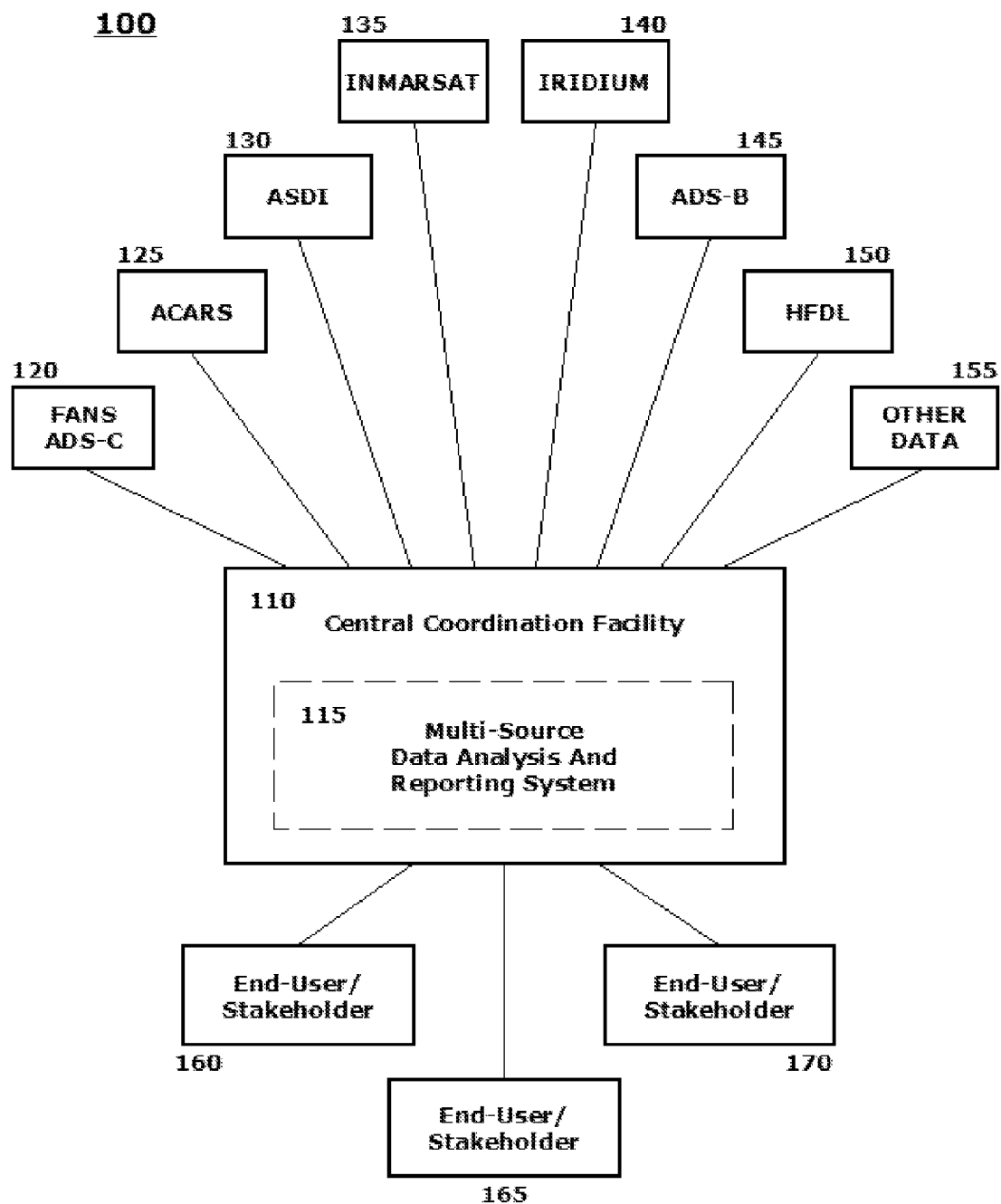
FIG. 1 illustrates an exemplary overview of an operating environment in which the monitoring, collecting and aggregating of position location for a vehicle, and particularly an aircraft in flight, worldwide may be implemented according to this disclosure.

The disclosed systems and methods for monitoring, collecting and aggregating (blending) position (geographic location) information from multiple independent data sources to localize a position (geographic position) of any aircraft operating worldwide, and for providing the localized position (geographic location) information to one or more end-users and/or stakeholders in a format for direct integration into one or more graphical display mapping and/or situational awareness display components or applications operated by the end-user or stakeholder, will generally refer to this specific utility for those systems and methods. Exemplary embodiments will be described in this disclosure as being particularly adaptable to use in advanced aircraft flight following for collecting and resolving a real-time, or near real-time, location of any aircraft operating anywhere in the world, and to provide a data feed to an end-user and/or stakeholder in a graphical display format that may be particularly usable by the end-user and/or stakeholder. These descriptions should not be interpreted as specifically limiting the disclosed schemes to any particular configuration of a system for implementing such an advanced aircraft flight following scheme, or as requiring data from all of the listed data sources or from only the listed data sources. In fact, the systems and methods according to this disclosure may be equally applicable to other vehicle position monitoring schemes given the correct combinations of data sources. Any particular capacity of tracking real-time positioning of an aircraft according to the disclosed schemes, and for reporting the collected and analyzed data to one or more end-users and/or stakeholders in a format that is centrally generated and provided as a data feed for direct integration into any graphical display mapping and/or other situational awareness display component operated by the end-user and/or stakeholder is contemplated as being covered by this disclosure.

Specific reference to, for example, the above-discussed real-world scenarios to which the systems and methods according to this disclosure may have been particularly adaptable in the past are provided as examples that motivated the inventors to arrive at the disclosed advanced aircraft tracking and flight following solutions. These examples are not intended to limit the disclosed subject matter in any manner. Additionally, reference is made above, and specific description will be included below, to certain data sources that may be advantageously usable to implement the disclosed schemes. These references as well are intended to provide an overview of the types of data sources that may be usable to provide the overlapping information for the disclosed analytic (blending) algorithm to resolve a real-time, or near real-time, location of an aircraft anywhere in the world and to the types of transformative (translation) systems that may be usable to provide that information to an end-user and/or stakeholder for their beneficial use in a format that allows for direct integration into their chosen systems. Again here, these references should be understood as being exemplary only, and not limiting the disclosed schemes, in any manner, to (1) any particular class of data sources or (2) any particular communication link or protocol (a) between the data sources and the centralized analytic capability or (b) between the centralized analytic capability and any one or more of the end-users and/or stakeholders in implementing the disclosed schemes or (3) any particular display application. For example, reference is made to ARINC GLOBALink$^{SM}$ WebASD$^{SM}$, ARINC GLOBALink$^{SM}$Skyview$^{SM}$, and ARINC GLOBALink$^{SM}$WebUAS$^{SM}$ as examples of commercially available graphical mapping and/or situational awareness display products. Although the systems and methods according to disclosure may be particularly adaptable for use in these graphical mapping and/or situational awareness display products, these are but examples of the types of graphical mapping and/or situational awareness display products that an end-user and/or stakeholder may employ to display the data regarding the received and resolved aircraft position location information on a worldwide scale.

Features and advantages of the disclosed embodiments will be set forth in the description that follows, and will be, at least in part, obvious from the description, or may be learned by practice of the disclosed embodiments. The features and advantages of the disclosed embodiments may be realized and obtained by means of the instruments and combinations of features particularly pointed out in the appended claims.

Various embodiments are disclosed and discussed in detail below. While specific implementations are discussed, it should be understood that this is done for illustration purposes only. A person skilled in the relevant art will recognize that other components and configurations may be used without departing from the spirit and scope of the disclosed embodiments.

Today, there are a number of data sources that can provide position or geographic location information for aircraft operating in areas of the world. A difficulty is that information from a single source may be inaccurate. Even in areas where coverage may be overlapping, a combination of information from separate data sources may not result in a resolution of an aircraft position or geographic location according to a desired degree of accuracy. The disclosed schemes may continually, or discretely monitor a plurality of data sources to acquire geographic location or positional information for an aircraft. The disclosed schemes may then apply statistical and probabilistic analysis to the data to provide an accuracy not previously achievable in the information provided to one or more end-users and/or stakeholders.

An objective premise of the systems and methods according to this disclosure is that multiple data sources may be required in order to provide adequate assurance that an aircraft can be tracked worldwide. The systems and methods according to the disclosure rely on information obtained from multiple data sources in order that the disclosed schemes can provide continuous coverage that can sustain a loss of one or more data feeds from the multiple data sources and still provide reasonably accurate positional data. It can be shown that the statistical probability of tracking an aircraft in the accuracy of that aircraft position are greatly enhanced through the use of information provided by multiple data sources. The disclosed schemes may apply an algorithm that obtains information to which the algorithm then applies weighting factors based on known static and/or dynamic accuracy and/or precision metrics that may be separately defined for, and applicable to, each of the multiple data sources individually. The dynamic accuracy factors may be based on a time latency of the last position or other information report received via a particular data source. An objective of the disclosed schemes is to be able to blend all of the available multiple sources of aircraft positional data to arrive at the resolved geographic position at a particular time for an aircraft operating anywhere in the world.

The implementing schemes according to this disclosure may employ an algorithm that blends the information received from the multiple data sources through the application of a prioritization of the information provided based on analysis of that information and/or on application of weighting factors and an aggregation of the all source data. The prioritization allows the data to be rank ordered based on the inherent accuracy and precision metrics applicable to each data source when the data is available from multiple sources, the source with the highest ranking is used and the others may be discarded or otherwise relied upon to a lesser extent. An end-user and/or stakeholder may be made aware of the type of data being used, and a result arriving from one data source may be all that is depicted.

The blending algorithm involves the weighting of various data sources. This weighting capability requires an understanding and predetermination of the overall accuracy and precision metrics applicable to the individual data sources. In contrast to the prioritization method, the weighting approach will assign a weight to positional data received from each data source and arithmetically combine (blend) the data into a single resolved position report based on rigorous analysis and an assessment of any static and/or dynamic accuracy factors applicable to one or more of the data sources.

Future Navigation System (FANS) Automatic Dependent Surveillance-Contract (ADS-C) is a method of aircraft surveillance that depends on an automatic downlink of reports from an aircraft avionics system whenever specific events occur, or at a particular predetermined time interval. FANS ADS-C reports do not require independent surveillance sources such as, for example, a radar antenna or other like component, to operate. This type of position reporting is very capable and flexible, ranking high in these regards amongst all of the listed data sources. An ADS Contract is an agreement between a ground facility and an aircraft consisting of the request (uplink) and an acknowledgment (downlink). Once a contract has been established, position reports will be sent to the contracted ground facility until either the conditions specified in the request are met, or the contract is explicitly canceled as between the ground facility and the aircraft.

ADS-C position reports are exchanged between aircraft and air navigation service providers. A centrally located FANS manager may provide dispatchers with the interface through which the dispatchers may be able to establish a "handshake" with an aircraft avionics system for the delivery of ADS position reports. Once the handshake is established, the dispatcher may be able to request the delivery of position reports at specific intervals in time, or upon the occurrence of specific events. The position reports may be (1) current (on-demand) position reports, (2) periodic position reports (delivered a set time interval) and (3) event position reports, which are generated when a specific condition and/or event occurs that matches a condition and/or event specified in the contact request.

FANS position reports, once received and decoded, or forwarded to a target situational awareness display component. Regardless of the type, each of the position reports contains standard positional data including, for example, current latitude, longitude, altitude and time along with any other information pertinent to the type of report selected.

For those aircraft that are data link equipped, position reports may be optionally generated over the Aircraft Communications Addressing and Reporting System (ACARS). ACARS position reports generally include current latitude, longitude, time, aircraft identification and, where applicable, flight identification. ACARS is customizable and individual air carriers often take advantage of the option to associate with the position reports. Such information may include, for example, departure airport, destination airport, a projected estimated time of arrival at the destination airport, a current fuel on board, and other like information.

Aircraft Situational Display to Industry (ASDI) provides data that is derived from actual radar contacts. The timing, sequencing and overall accuracy of the data received from the various Air Route Traffic Control Centers (ARTCCs) may present challenges with blending the data. Data of this type is currently available in the United States and the United Kingdom airspace only. The acquisition of ASDI data from other global sources is in work. EUROCONTROL provides a pseudo-ASDI product that may be implemented similar to actual ASDI. The access control points are widely geographically dispersed.

INMARSAT Free Airline Tracking Service was recently proposed for hosting on the INMARSAT global communication network "as part of the anticipated adoption of further aviation safety service measures by the world's airlines following a loss of flight MH 370." This service is expected to provide positional data for nearly all of the world's long-haul commercial aircraft. Satellite data of this type can provide an additional source of positional information for operations over certain remote parts of the world.

Automatic Dependent Surveillance-Broadcast (ADS-B) is a surveillance technology for tracking aircraft. The aircraft determines its own position via satellite navigation and periodically broadcasts position reports. The information can be received by air traffic control ground stations as a replacement for secondary radar. The system relies on two avionics components. There is (1) a high integrity GPS navigation source and (2) an ADS-B data link unit mounted in the aircraft for providing information to an ADS-B ground station. There are several types of certified ADS-B data links, but the most common ones operate in the 1090 MHz frequency band, essentially as modified Mode S transponders. An ADS-B position report may include the following elements: date/time; aircraft registration; flight identification; airline agency code; latitude and longitude position data; altitude data; airspeed data and vertical speed data.

High Frequency Data Link (HFDL) is a communications medium used to exchange data between compatible aircraft-installed communication components and a plurality of HFDL ground stations worldwide. HFDL advantageously employs the unique atmospheric propagation characteristics of high-frequency (HF) radio waves and a network of HFDL ground stations to provide data link communications to properly equipped aircraft operating anywhere in the world using, for example, the multi-hop propagation characteristics of HF data communication. Each HFDL ground station supports primary data link coverage for a radius of up to three thousand nautical miles. Overlapping primary coverage areas are enhanced by the natural ability of HF radio signals to support extra long-range communications beyond the primary coverage areas. An objective of current HFDL implementations is that participating aircraft are never out of touch either in the air or on the ground.

A current HFDL communication network and its associated capacity provide overlap and redundancy in the event of a failure of a particular one of the networked HF ground stations. This network provides nearly complete global coverage, including at both poles, with substantially unbroken system availability rates in support of continuous aircraft communications. HFDL provides an invaluable supplement to other broad based communication systems, including HF voice communications. Because data link communications use significantly less bandwidth than voice communications, HF data may continue to be decoded even in instances when HF voice becomes unusable in a particular region.

Frequency and performance diagnostic information is transmitted between the aircraft and the HFDL ground stations on a regular basis. The HFDL ground station controls the frequency that the diagnostic data packets are transmitted. With each log on to the HFDL ground station, the airborne HF radio will transmit a frequency diagnostic data packet. Performance data packets are also transmitted to the HFDL ground station if there is a data space in an ACARS message or in response to polling by the HFDL ground station. Both performance and frequency data packets containing aircraft position data and time of day that the packet was formed. Currently, the HFDL ground stations are set to poll aircraft at least every ten minutes during periods of inactivity. During extended over-water operations, this may be one of the few data sources available for resolving positional data according to the schemes disclosed. The aircraft position data contained within the HFDL data packets may be stored within the HFDL ground station and may also be sent real-time to a central server. All available HFDL data packets are batch processed each day at 00:00 GMT and are accessible by technical staff for analysis throughout a particular day.

FIG. 1 illustrates an exemplary overview of an operating environment 100 in which the monitoring, collecting and aggregating of position or geographic location information for a vehicle, and particularly an aircraft in flight, worldwide may be implemented according to this disclosure. As shown in FIG. 1, the exemplary operating environment 100 involves myriad lines of communication (wired or wireless) between a central coordination facility, acting as a centralized all source data monitoring, collection and analysis node, and a number of widely-dispersed communication nodes.

The widely-dispersed communication nodes may include a plurality of data sources 120-155, particularly, but not limited to, those described above. FIG. 1 includes, for example, depiction of an "other data" data source 155 to signify that the disclosed embodiments are not necessarily limited to, nor limited by, the above-described myriad data sources. In fact, the systems and methods according to this disclosure leave open the possibility that additional data sources that can be monitored, and from which information such as that available from the multiple specific data sources described above, may be added to the disclosed system as they become available. It is not anticipated that any individual data source made available in the near future will be able to provide all of the information that may be available from the overlapping coverage provided by the above-discussed data sources. As such, the disclosed schemes for integration, aggregation, analysis, and particularly blending, of the information available from the multiple data sources will remain relevant despite the addition of new technologies and the presentation of newly-available data sources including such technologies.

The widely dispersed nodes may also include a plurality of end-user and/or stakeholder nodes 160-170 within the central coordination facility 110 that may be in wired or wireless communication continuously, periodically or otherwise at discrete intervals. These end-user and/or stakeholder nodes may include, for example, air navigation service providers (ANSPs) worldwide, whether they are governmental departments/agencies, state-owned companies, corporations or other entities, or private/commercial organizations. The stakeholders may also include commercial airline companies, business jet service providers, military aviation-related entities, organizations involved in aviation search and rescue, and the like. A premise behind the disclosed advanced aircraft flight following schemes is that the central coordination facility 110 will collect, analyze (blend), and resolve real-time, near real-time, and projected aircraft positions/geographic locations worldwide and provide data regarding those aircraft positions/geographic locations worldwide to individual end-users and/or stakeholders including only the aircraft in which an individual end-user and/or stakeholder may be interested, and in a format that provides for direct integration into a graphical mapping and/or situational awareness display component or application operated by the individual end-user and/or stakeholder.

The central coordination facility 110 may have associated with it, as an integral component, or as a separate connected component, a multi-source data analysis and reporting system 115. Such a multi-source data analysis and reporting system 115, as will be discussed in greater detail below, may be used to implement the disclosed advanced aircraft flight following scheme, including monitoring, data collection, data analysis (blending), data formatting and translation, and data reporting to end-users and/or stakeholders.

In a normal course of operation, the multi-source data analysis and reporting system 115 may monitor the plurality of data sources 120-155, and collect data from the individual data sources of the plurality of data sources 120-155 that may be accessible at any given time. The collected data may include, for example, vehicle (aircraft) locating information, communicating information and/or operating information. Deviation information may be available for each of the data sources. The deviation information may include known or historically-developed accuracy and/or precision metrics for each of the data sources. The deviation information for each of the data sources may be static, or may be dynamic based on environmental, propagation, and other characteristics, as well as a time latency of the collected information from the particular data source. The multi-source data analysis and reporting system 115 may apply the deviation information to the collected location information, or to an estimated location generated based on the communicating and/or operating information available from any particular data source to generate a corrected vehicle location ellipse for each of the plurality of accessible data sources 120-155.

An analytic algorithm may then be applied to the generated corrected vehicle location ellipses to weight the corrected vehicle location data available from each of the plurality of accessible data sources 120-155 and arithmetically combine the data into a single resolved accurate location or geographic position of the aircraft at a particular time. Arriving at a single resolved accurate location or geographic position for the aircraft at the particular time, the multi-source data analysis and reporting system 115 may determine which of a plurality of end-users and/or stakeholders require awareness of the resolved accurate location or geographic position for the particular aircraft under observation. The multi-source data analysis and reporting system 115 may then translate the data into a graphical display format to be directly integrated into the mapping and/or situational awareness display components and/or applications employed by the determined end-users and/or stakeholders. The multi-source data analysis and reporting system 115 may then transmit the translated data for direct integration into the mapping and/or situational awareness display components and/or applications. In this manner, all of the data source monitoring, data collection, data analysis, data translation/formatting, and data reporting, and the computing and communicating overhead associated with carrying into effect these separate functions, may be resident in the central coordination facility 110, with the information being delivered to the end-users and/or stakeholders as a packaged data product.

Figure 2:
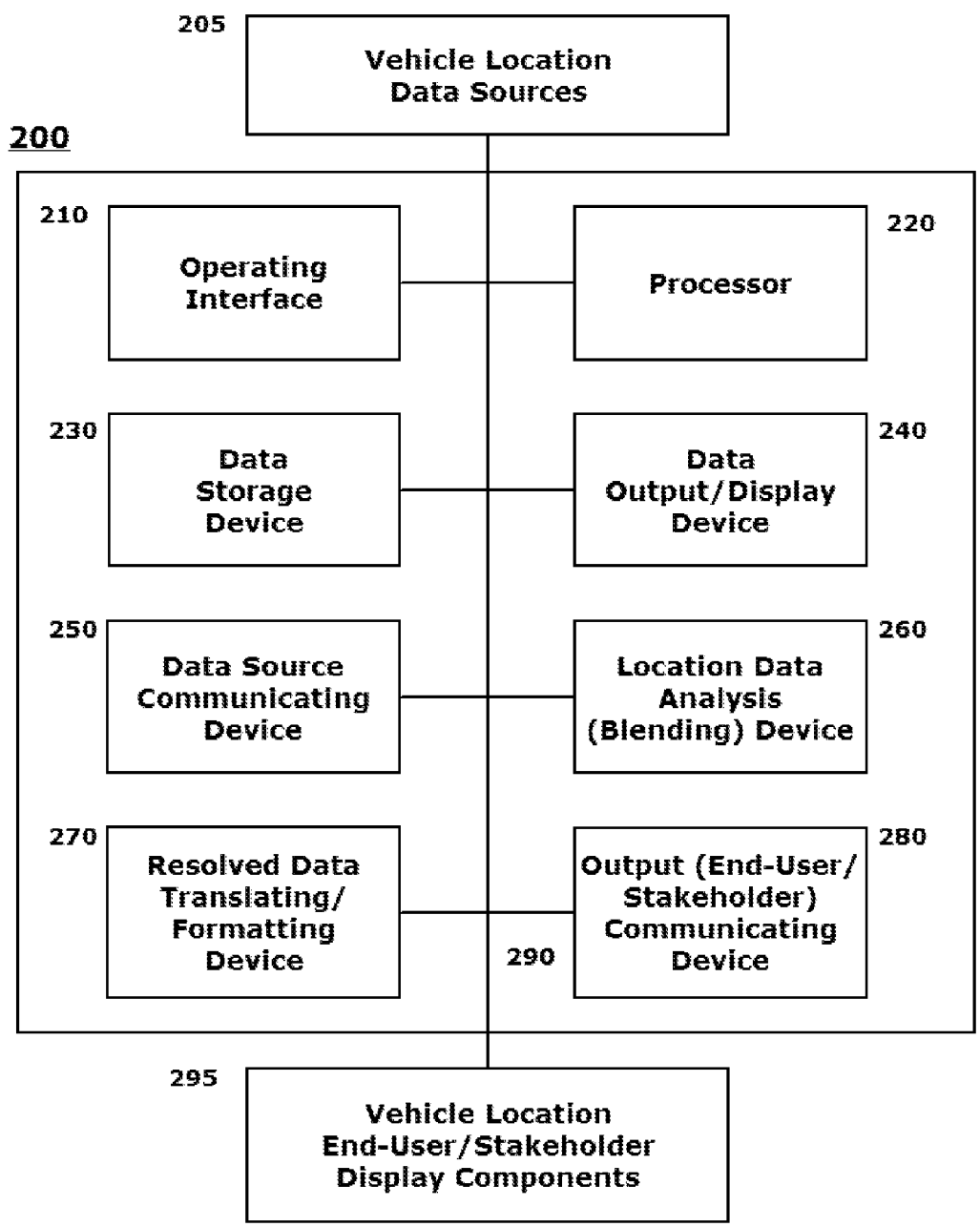
FIG. 2 illustrates an exemplary system for collecting and aggregating the position location information for a vehicle, including an aircraft in flight, and for providing that information in a graphical display format usable by one or more end-users and/or stakeholders according to this disclosure.

FIG. 2 illustrates an exemplary system 200 for collecting and aggregating the position location information for a vehicle, including an aircraft in flight, and for providing that information in a graphical display format usable by one or more end-users and/or stakeholders according to this disclosure. The exemplary system 200 shown in FIG. 2 may be implemented as a multi-source data analysis and control system (element 115 in FIG. 1) in a central coordination facility (element 110 in FIG. 1), or may be implemented as a combination of system components associated with the central coordination facility, including cloud-based processing and data storage components, which may be accessed remotely. The exemplary system 200 may monitor and collect information from a plurality of vehicle location data sources 205. The processing elements of the exemplary system 200 may then process the collected vehicle location data as discussed above, and as will be described in some detail below, and output resolved location information for a vehicle at a particular time in a format to be directly integrated into one or more vehicle location end-user/stakeholder display components 295.

The exemplary system 200 may include an operating interface 210 by which a user may communicate with the exemplary system 200 for directing at least a mode of operation of the exemplary system 200 in implementing the separate functions of the exemplary system 200 in performing the advanced aircraft flight following as discussed above. Control inputs received in the exemplary system 200 via the operating interface 210 may be processed and communicated to any one of the many connected nodes in communication with the central coordination facility, including a plurality of vehicle location data sources 205 and a plurality of end-users and/or stakeholders vehicle location display components 295. The operating interface 210 may be a part or a function of a graphical user interface (GUI) mounted on, integral to, or associated with, the exemplary system 200. The operating interface 210 may alternatively take the form of any commonly-employed user-interactive device by which a user may input and/or command an input to an automated processing system including, but not limited to, a keyboard or a touchscreen, a mouse or other pointing device, a microphone for providing verbal commands, or any other commonly-known operating interface I/O device.

The exemplary system 200 may include one or more local processors 220 for carrying out the individual operations and functions of the exemplary system 200. The processor 220 may reference, for example, each of the vehicle location data sources 205 to monitor its accessibility and to carry into effect the data collection, analysis, translation and reporting functions discussed above.

The exemplary system 200 may include one or more data storage devices 230. Such data storage device(s) 230 may be used to store data or operating programs to be used by the exemplary system 200, and specifically the processor(s) 220 in carrying into effect the disclosed operations and functions. Data storage device(s) 230 may be used to store information regarding known accuracy and/or precision metrics for each of the vehicle location data sources 205.

The data storage device(s) 230 may include a random access memory (RAM) or another type of dynamic storage device that is capable of storing updatable database information, and for separately storing instructions for execution of system operations by, for example, processor(s) 220. Data storage device(s) 230 may also include a read-only memory (ROM), which may include a conventional ROM device or another type of static storage device that stores static information and instructions for processor(s) 220. Further, the data storage device(s) 230 may be integral to the exemplary system diagnostic device 200, or may be provided external to, and in wired or wireless communication with, the exemplary system 200, including cloud-based storage and/or processing elements.

The exemplary system 200 may include at least one data output/display device 240, which may be configured as one or more conventional mechanisms that output information to a user, including, but not limited to, a display screen on a GUI associated with the exemplary system 200 to provide feedback to a local user regarding operation of the exemplary system 200. The at least one data output/display device 240 may separately be configured as one or more of a local graphical situational awareness display component or a display device executing a mapping or situational awareness display application.

The exemplary system 200 may include at least one data source communicating device 250 in the form of an external data communication interface by which the exemplary system 200 may communicate with the separate vehicle location data sources 250.

The exemplary system 200 may include a location data analysis (blending) device 260. The location data analysis (blending) device 260 may be a function of the processor 220 in communication with the data storage device 230, or may be a stand-alone device or unit within the exemplary system 200. The location data analysis (blending) device 260 may be the component that applies the known static or dynamic accuracy and/or precision metrics to the collected data from the plurality of vehicle location data sources 205. The location data analysis (blending) device 260 may then apply a weighting factor to each of the vehicle locations individually resolved based on information received from the plurality of vehicle location data sources 205. The location data analysis (blending) device 260 may then blend the individual the individually resolved vehicle locations to arrive at an overall accurate vehicle location based on the totality of the available data.

Once an overall accurate vehicle location is arrived at, a determination may be made regarding which of a plurality of end-user and/or stakeholder vehicle location display components 295, the overall accurate vehicle location information should be directed to. A resolved data translating/formatting device 270 may be employed to translate and/or format the overall accurate vehicle location information to a graphical display format that may be directly integrated into the one or more determined vehicle location end-user/stakeholder display components 295.

The exemplary system 200 may include an output (end-user/stakeholder) communicating device 280 for communicating the translated resolved data regarding the overall accurate vehicle location to the one or more of the vehicle location end-user/stakeholder display components 295.

All of the various components of the exemplary system 200, as depicted in FIG. 2, may be connected internally, and potentially to a central coordination facility, by one or more data/control busses 290. These data/control busses 290 may provide wired or wireless communication between the various components of the exemplary system diagnostic device 200, whether all of those components are housed integrally in, or are otherwise external and connected to, other components of an overarching access control system with which the exemplary system diagnostic device 200 may be associated.

It should be appreciated that, although depicted in FIG. 2 as an essentially integral unit, the various disclosed elements of the exemplary system diagnostic device 200 may be arranged in any combination of sub-systems as individual components or combinations of components, integral to a single unit, or external to, and in wired or wireless communication with, the single unit of the exemplary system 200. In other words, no specific configuration as an integral unit or as a support unit is to be implied by the depiction in FIG. 2. Further, although depicted as individual units for ease of understanding of the details provided in this disclosure regarding the exemplary system 200, it should be understood that the described functions of any of the individually-depicted components may be undertaken, for example, by one or more processors 220 connected to, and in communication with, one or more data storage device(s) 230, all of which may support operations in the associated system.

Figure 3:
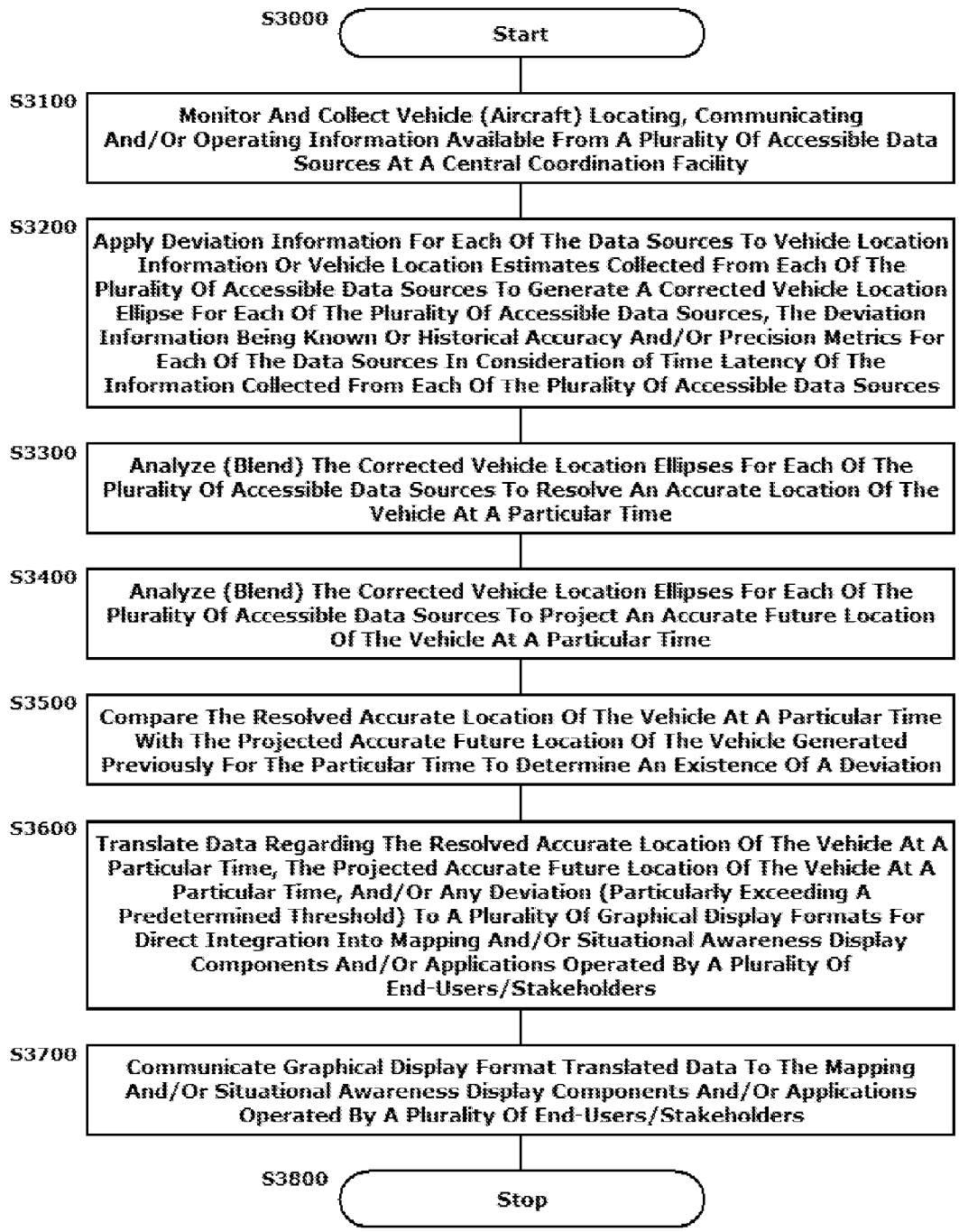
FIG. 3 illustrates a flowchart of an exemplary method for effecting the monitoring, collecting and aggregating of position location information for the vehicle, and particularly an aircraft in flight, worldwide according to this disclosure.

The disclosed embodiments may include an exemplary method for effecting the monitoring, collecting and aggregating of position location information for the vehicle, and particularly an aircraft in flight, worldwide. FIG. 3 illustrates a flowchart of such an exemplary method. As shown in FIG. 3, operation of the method commences at Step S3000 and proceeds to Step S3100.

In Step S3100, a plurality of vehicle location data sources may be monitored. Continuously or at intervals, vehicle locating, communicating and/or operating information may be collected from a plurality of accessible data sources. This collection may be accomplished by, for example, a central coordination facility. Operation of the method proceeds to Step S3200.

In Step S3200, a deviation information for each of the data sources may be applied to vehicle location information or vehicle location estimates collected from each of the plurality of the accessible data sources. The deviation information may include non- or historical accuracy and/or precision metrics for each of the data sources. The deviation information may consider dynamic changes in the accuracy and/or precision metrics based on a time latency of the information collected from each of the plurality of accessible data sources. Once the deviation information is applied, a corrected vehicle location ellipse for each of the plurality of accessible data sources may be generated. Operation of the method proceeds to Step S3300.

In Step S3300, the corrected vehicle location ellipses for each of the plurality of accessible data sources may be analyzed according to a blending algorithm to resolve an accurate location of the vehicle at a particular time. Operation of the method proceeds to Step S3400.

In Step S3400, the corrected vehicle location ellipses for each of the plurality of accessible data sources may be analyzed according to a blending algorithm to project an accurate future location of the vehicle at a particular time. Operation of the method proceeds to Step S3500.

In Step S3500, the resolved accurate location of the vehicle at a particular time may be compared with the projected accurate future location of the vehicle generated previously for the particular time to determine existence of a deviation between these locations. Operation of the method proceeds to Step S3600.

In Step S3600, data regarding the resolved accurate location of the vehicle at a particular time, the projected accurate future location of the vehicle at a particular time and/or any deviation (particularly a deviation exceeding a predetermined threshold) may be translated to one or more of a plurality of graphical display formats. The translation to the one or more of the plurality of graphical display formats may facilitate direct integration into mapping and/or situational awareness display components and or applications operated by a plurality of end-users and/or stakeholders. Operation of the method proceeds to Step S3700.

In Step S3700, the graphical display format translated data may be communicated to the mapping and/or situational awareness display components and/or applications operated by the plurality of end-users and/or stakeholders. Operation of the method proceeds to Step S3800, where operation of the method ceases.

The disclosed embodiments may include a non-transitory computer-readable medium storing instructions which, when executed by a processor, may cause the processor to execute all, or at least some, of the functions that may be appropriate to implement the steps of the method outlined above.

The above-described exemplary systems and methods reference certain conventional components and known data sources to provide a brief, general description of suitable operating environments in which the subject matter of this disclosure may be implemented for familiarity and ease of understanding. Although not required, embodiments of the disclosed systems, and implementations of the disclosed methods, may be provided and executed, at least in part, in a form of hardware circuits, firmware, or software computer-executable instructions to carry out the specific functions described. These may include individual program modules executed by one or more processors. Generally, program modules include routine programs, objects, components, data structures, and the like that perform particular tasks or implement particular data types in support of the overall objective of the systems and methods according to this disclosure.

Those skilled in the art will appreciate that other embodiments of the disclosed subject matter may be practiced in implementing an advanced aircraft flight following scheme using many and widely-varied system components.

As indicated above, embodiments within the scope of this disclosure may also include computer-readable media having stored computer-executable instructions or data structures that can be accessed, read and executed by one or more processors in differing devices, as described. Such computer-readable media can be any available media that can be accessed by a processor, general purpose or special purpose computer. By way of example, and not limitation, such computer-readable media can comprise RAM, ROM, EEPROM, CD-ROM, flash drives, data memory cards, or other analog or digital data storage device that can be used to carry or store desired program elements or steps in the form of accessible computer-executable instructions or data structures. When information is transferred or provided over a network or another communication connection, whether wired, wireless, or in some combination of the two, the receiving processor properly views the connection as a computer-readable medium. Thus, any such connection is properly termed a computer-readable medium. Combinations of the above should also be included within the scope of the computer-readable media for the purposes of this disclosure.

Computer-executable instructions include, for example, non-transitory instructions and data that can be executed and accessed respectively to cause a processor to perform certain of the above-specified functions, individually or in various combinations.

The exemplary depicted sequence of executable instructions or associated data structures for carrying into effect the steps of the above method represent one example of a corresponding sequence of acts for implementing the functions described in the steps of the method. The exemplary depicted steps may be executed in any reasonable order to carry into effect the objectives of the disclosed embodiments. No particular order to the disclosed steps of the method is necessarily implied by the depiction in FIG. 3, except where execution of a particular method step is a necessary precondition to execution of any other method step.

Although the above description may contain specific details, they should not be construed as limiting the claims in any way. Other configurations of the described embodiments of the disclosed systems and methods are part of the scope of this disclosure. It will be appreciated that various of the above-disclosed and other features and functions, or alternatives thereof, may be desirably combined into many other different systems or applications. Although the above description may contain specific details, they should not be construed as limiting the claims in any way. Other configurations are part of the scope of the disclosed embodiments. For example, the principles of the disclosed embodiments may be applied to each individual data collection and reporting event that may individually reliably employ components of the disclosed system for dance aircraft flight following. This enables data exchange to enjoy the benefits of the disclosed embodiments even if any one of the large number of possible data sources and/or end-user/stakeholder nodes do not need some portion of the described functionality. In other words, there may be multiple instances of the disclosed system each processing the content in various ways. It does not necessarily need to be one system used by all end-user nodes. Accordingly, the appended claims and their legal equivalents should only define the disclosed embodiments, rather than any specific examples given.

We claim:

1. A system for aircraft flight following, comprising:
a first communication interface for monitoring a plurality of active data sources that communicate with aircraft;
a data collection device that collects aircraft communicated information from the plurality of active data sources;

an analysis device that:
　applies a weighting factor for each active data source to the aircraft communicated information for an aircraft collected from the each active data source to generate a data source approximated geographic position for the aircraft;
　analyzes the plurality of data source approximated geographic positions for the aircraft for the plurality of active data sources to resolve an actual geographic position of the aircraft; and
　blends the plurality of data source approximated geographic positions for the aircraft to resolve actual geographic position of the aircraft.

2. The system of claim 1, the aircraft communicated information being aircraft geographic location information communicated from the aircraft to at least one of the plurality of active data sources.

3. The system of claim 2, the at least one of the plurality of active data sources being one or more of a Future Air Navigation System (FANS) Automatic Dependent Surveillance (ADS-C), an Aircraft Communications Addressing and Reporting System (ACARS), an Aircraft Situational Display to Industry (ASDI), an INMARSAT® Airline Tracking Service, an Iridium® Position Data Reporting System, and an Automatic Dependent Surveillance-Broadcast (ADS-B) Position Reporting System.

4. The system of claim 1, the aircraft communicated information being at least one of aircraft communicating and operating information communicated from the aircraft to at least one of the plurality of active data sources, an estimated geographic location for the aircraft being derived from the at least one of the aircraft communicating and operating information.

5. The system of claim 4, the plurality of active data sources including at least a High Frequency Data Link (HFDL) network system.

6. The system of claim 1, the weighting factor being based on at least one of a known or historical accuracy/precision metric applicable to the each active data source.

7. The system of claim 1, the analysis device (1) rank ordering the plurality of data source approximated geographic positions for the aircraft based on a consideration of the weighting factor for the each active data source, and (2) selecting a highest ranked data source approximated geographic position for the aircraft as the resolved actual geographic position of the aircraft.

8. The system of claim 1, wherein the analysis device blends data source approximated geographic positions for the aircraft from at least three separate data sources of the plurality of active data sources.

9. The system of claim 1, further comprising a second communication interface for transmitting the resolved actual geographic position of the aircraft to one or more remote end-users.

10. The system of claim 9, further comprising a graphical display translation device that (1) determines a graphical display component capability for a particular one of the one or more remote end-users to which the resolved actual geographic position of the aircraft is transmitted, and (2) translates the resolved actual geographic position of the aircraft to a graphical display format for direct integration of the actual geographic position of the aircraft to a graphical display component for the particular one of the one or more end-users.

11. A system for aircraft flight following, comprising:
　a first communication interface for monitoring a plurality of active data sources that communicate with aircraft;
　a data collection device that collects aircraft communicated information from the plurality of active data sources;
　an analysis device that:
　　applies a weighting factor for each active data source to the aircraft communicated information for an aircraft collected from the each active data source to generate a data source approximated geographic position for the aircraft;
　　analyzes the plurality of data source approximated geographic positions for the aircraft for the plurality of active data sources to resolve an actual geographic position of the aircraft, wherein the weighting factor being based on a time latency of the collected aircraft communicated information from the each active data source.

12. A method for implementing aircraft flight following, comprising:
　monitoring a plurality of active data sources that communicate with aircraft; collecting aircraft communicated information from the plurality of active data sources;
　applying, with a processor, a weighting factor for each active data source to the aircraft communicated information for an aircraft collected from the each active data source to generate a data source approximated geographic position for the aircraft; and
　analyzing, with the processor, the plurality of data source approximated geographic positions for the aircraft for the plurality of active data sources to resolve an actual geographic position of the aircraft, wherein the analyzing comprises blending the plurality of data source approximated geographic positions for the aircraft to resolve the actual geographic position of the aircraft.

13. The method of claim 12, the aircraft communicated information being aircraft geographic location information communicated from the aircraft to at least one of the plurality of active data sources, including one or more of a Future Air Navigation System (FANS) Automatic Dependent Surveillance (ADS-C), an Aircraft Communications Addressing and Reporting System (ACARS), an Aircraft Situational Display to Industry (ASDI), an INMARSAT® Airline Tracking Service, an Iridium® Position Data Reporting System, and an Automatic Dependent Surveillance-Broadcast (ADS-B) Position Reporting System.

14. The method of claim 12, the aircraft communicated information being at least one of aircraft communicating and operating information communicated from the aircraft to at least one of the plurality of active data sources, an estimated geographic location for the aircraft being derived from the at least one of the aircraft communicating and operating information, the at least one of the plurality of active data sources including at least a High Frequency Data Link (HFDL) network system.

15. The method of claim 12, the weighting factor being based on at least one of a known or historical accuracy/precision metric applicable to the each active data source, and a time latency of the collected aircraft communicated information from the each active data source.

16. The method of claim 12, the analyzing comprising:
　rank ordering the plurality of data source approximated geographic positions for the aircraft based on a consideration of the weighting factor for the each active data source, and
　selecting a highest ranked data source approximated geographic position for the aircraft as the resolved actual geographic position of the aircraft.

17. The method of claim 12, the blending including data source approximated geographic positions for the aircraft from at least three separate data sources of the plurality of active data sources.

18. The method of claim 12, further comprising:
determining a graphical display component capability for a particular one of the one or more remote end-users to which the resolved actual geographic position of the aircraft is to be transmitted;
translating the resolved actual geographic position of the aircraft to a graphical display format for direct integration of the actual geographic position of the aircraft to a graphical display component for the particular one of the one or more end-users; and
transmitting the translated resolved actual geographic position of the aircraft to the one or more remote end-users.

\* \* \* \* \*